Patented Aug. 23, 1932

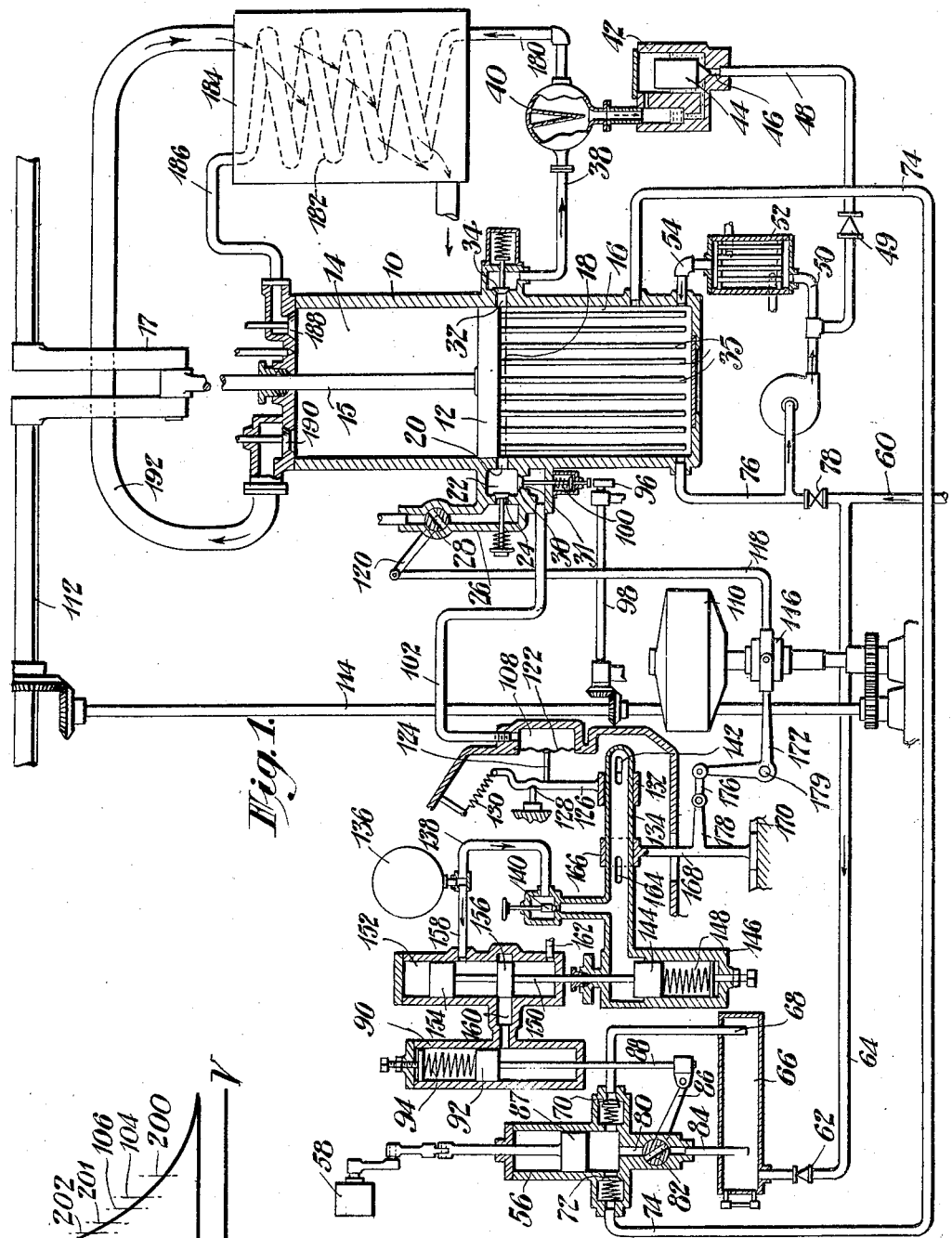

1,872,932

UNITED STATES PATENT OFFICE

WINDER E. GOLDSBOROUGH, OF SOUTH NORWALK, CONNECTICUT, ASSIGNOR TO DOHERTY RESEARCH COMPANY, OF NEW YORK, N. Y., A CORPORATION OF DELAWARE

INFRIGIDATION FOR GAS COMPRESSORS

Application filed March 22, 1928. Serial No. 263,626.

The invention relates to combustion engines having gas compressing means external to the combustion space. More particularly the invention relates to cooling gas during compression for use in combustion chambers or other places.

It has been proposed to cool air during compression by attaching to a vertically moving piston a series of plates, rods or small tubes arranged to dip into a body of water below the compression space.

In cooling gas in the way just mentioned, difficulties have been encountered in the way of maintaining a constant clearance volume in the chamber in which the air is compressed. If the water level in the gas compression chamber falls below the normal position, the clearance is too large and the output and air pressure of the compressor are adversely affected. If the water level rises above the normal position, there is danger that the piston will strike the water surface thereby producing objectionable pounding and possibly damaging the apparatus.

It is one of the principal objects of the present invention to provide a means for maintaining liquid in the compression chamber always at the same level in the compression chamber at the instant of maximum compression and during expulsion.

The second object of the present invention is to produce a mechanism which materially contributes to the uniform speed regulation of the internal combustion engine when subjected to wide variations in load.

The third object of the present invention is to produce an apparatus and method for limiting to a maximum the level of liquid in a reservoir or chamber when said liquid is influenced by recurring cycles of pressure variation between substantially fixed extremes of pressures.

Another object of the present invention is to produce an apparatus and method for the maintenance of the maximum water level in a reservoir or chamber substantially constant when the extreme of the maximum pressure to which the liquid is subjected varies considerably within the range of two or more successive cycles.

Another object of the present invention is to produce an apparatus and method for so accurately maintaining a maximum water level in a cylinder as to make it safe to have a rapidly reciprocating piston within said cylinder approach at each stroke within 1/8" of said maximum water level.

It has been found in operating compressors having bodies of cooling water, or other cooling liquid, therein that the gas carries liquid with it out of the compression chamber. The loss of liquid from this cause increases and decreases with changes in the rate of discharge of gas from the compression chamber. In carrying out the above mentioned objects, the particular embodiment of the present invention disclosed herein has been designed to add to the body of liquid in the compression chamber at rates varying with the demand for gas on the compressor to maintain a constant maximum level in the compression chamber.

A specific embodiment of the present invention embodying the above mentioned and other objects is described hereinbelow in connection with the accompanying drawing, in which:

Fig. 1 is a vertical section somewhat diagrammatic in character of an internal combustion engine illustrating said embodiment of the present invention;

Fig. 2 is a pressure volume diagram illustrating the changes in pressure and volume of gas occurring during a complete stroke in the air compressing chamber forming a portion of the apparatus according to the present invention.

In the drawing, 10 is a cylinder in which is mounted for reciprocation a piston 12. In the arrangement illustrated, the piston 12 divides cylinder 10 into two chambers, the upper of said chambers is a combustion or power chamber 14 and the lower one is a compression chamber 16. Part of the power developed in chamber 14 by the combustion of fuel is used to compress air or other gas, in the chamber 16. The chamber 16 is enlarged to contain a body of cooling water or other liquid in its bottom below the intake and exhaust ports for the gas. The level of water in chamber 16 rises and falls during each stroke of the piston. The normal maximum level of the cooling water in chamber 16 is indicated at 18.

In the operation of the compressor as illustrated, the air enters chamber 16 through port 20. Port 20 leads to chamber 16 from an inlet chamber 22. Atmospheric air is taken into chamber 22 through an inlet valve 24 of the check valve type which controls the connection between chamber 22 and an inlet pipe 26 in which is a governor controlled throttle valve 28 for regulating the amount of air drawn into chamber 16 per stroke of piston 12. A port 31 opening out of chamber 22 is controlled by a valve 30, the purpose of which will hereinafter appear more particularly, but which forms a part of the means for regulating and stabilizing the level of the cooling water. The outlet for compressed gas from chamber 16 is through port 32. Port 32 is controlled by the outlet valve 34 which is of the check valve type.

It will be noted that ports 20 and 32 are placed at about the same level and that the center line through these ports is only slightly above the level 18 of the cooling liquid. After a charge of gas has been drawn into the chamber 16 on the upstroke of piston 12, it is compressed and forced out on the downstroke. The gas is cooled during the compression stroke both by contact with the surface of the liquid in chamber 16 and by contact with tubes 35 which are fastened to the bottom of the piston 12 and pass into the liquid below the surface 18. The liquid level in chamber 16 rises and falls as the tubes 35 are thrust into or withdrawn from the liquid in the chamber. This action, however, is in nowise essential to the invention and tubes 35 may be omitted if desired, but, in any case, piston 12 should not strike surface 18.

As the gas passes out through valve 34 it carries a certain amount of liquid with it, some in the form of liquid and some as vapor. The compressed gas and liquid pass together from outlet chamber 36 on the outlet side of valve 34 and from thence through pipe 38 to a separator 40 in which the non-vaporized liquid is removed from the air. From the separator 40 the liquid is returned to the bottom of chamber 16. The liquid from the separator falls first into a chamber 42 in which is a valve automatically passing liquids but preventing the passage of gases, such as the float valve 44, controlling the outlet 46 through the bottom of the chamber. The valve and the liquid in chamber 42 are both subject to the pressure of the compressed gas from separator 40 and the valve 44 is free to rise from its seat whenever it is actuated by the liquid in chamber 42. When valve 44 is off its seat, liquid passes from chamber 42 through outlet 46 and check valve 49 in pipe 48 into pipe 50 and thence through cooler 52 and pipe 54 to chamber 16. Check valve 49 prevents pressure pulsations from chamber 16 passing back through pipe 48 into float chamber 40 and interfering with the operation of float valve 44 by disturbing the level of the liquid in chamber 42. Liquid in the compressed gas in the form of vapor, however, constitutes a loss and must be replaced to keep the liquid surface 18 at an approximately constant level at the instant the piston is at the end of its forcing stroke. The loss from water or other liquid, in the form of vapor increases with the pounds of compressed air or other gas delivered by the compressor and the means for replacing liquid so lost must automatically change the rate of addition of liquid to chamber 16 with the output of the compressor.

In the embodiment of the invention illustrated in the drawing, water is supplied automatically to chamber 16 from a pump 56 driven by a motor 58. Pump 56 draws water from a supply pipe 60 through a check valve 62 in the pipe 64 through the chamber 66, pipe 68 and inlet valve 70 into its working barrel. Pump 56 forces water through outlet valve 72 and pipe 74 into chamber 16. This water constitutes what will hereinafter be referred to as make-up fluid which compensates for losses in vapor which is not trapped by the separator 40. Under certain conditions water under pressure can be introduced directly from pipe 60 into chamber 16 by means of pipe 76 and cut off valve 78. Except for initially letting water into chamber 16, or other specific adjustment, valve 78 must be tightly closed. Under normal running conditions all the water received by chamber 16 in excess of that from separator 40 is delivered by pump 56. The necessary variations in the rate of supply from pump 56 to chamber 16 are caused by passing more or less water from the pump barrel back to the inlet pipe 68 without its entering the discharge pipe 74. In the arrangement illustrated, the barrel of pump 56 has an outlet 80 controlled by turning cock 82 and the connecting with the chamber 66 by a pipe 84. When cock 82 is in such position that the opening 86 through the cock is in line with the outlet 80, all the water drawn into pump 56 on the upstroke of its piston 87 is discharged back into chamber 66 on the downstroke of the pump. When cock 82 is turned so that the opening therethrough is cut off from outlet 80 all the water contained in the pump at the beginning of its forcing stroke is discharged to chamber 16. Normally cock 82 is in such position that a portion of the water forced out of the barrel of the pump 56 at each downstroke of the piston is delivered to chamber 16 and the rest is allowed to return to chamber 66. Means are provided for regulating the position of cock 82 to maintain the water level 18 constant within narrow limits. For this purpose, cock 82 has a lever arm 86 fixed thereto and pivotally connected to the outer end of the piston rod 88 of a servo-motor 90. The positioning of the rod 88 and the resulting degree of opening of cock 82 is determined by fluid pressure in the lower part of motor 90 acting on the lower face of piston 92 in opposition to spring 94 acting against the upper face of piston 92. It is desired to move cock 82 more and more toward the closed position as the water level 18 in chamber 16 moves downward.

Now, the clearance in chamber 16 increases with a fall in level 18 and decreases with a rise in level 18. Therefore, the pressure in chamber 16 at a point in the forcing stroke intermediate the closing of the inlet valve 24 and opening of outlet valve 34 increases and decreases with the rise and fall of the water level at a point on the compression diagram about midway between atmospheric pressure and the discharge pressure. According to the present invention, the changes in pressure at a point in the forcing stroke such as that just mentioned are utilized to control the rate of addition of water to chamber 16. For this purpose, the valve 30 is opened once in each stroke of piston 12 by a cam 96 operated from the main shaft 112 by connections 98. Valve 30 is normally held closed by a spring 100 and the valve 30 is opened and held open by cam 96 during a short portion of the forcing stroke of the piston 12 so that the pressure in chamber 16 at the given point in the stroke is thereby permitted to enter pipe 102. The preferred portion of the forcing stroke of piston 12 during which valve 30 is held open is that between the lines 104 and 106 in pressure-volume diagram of Fig. 2 in single stage compressor cylinders between 201 and 202 in the high pressure cylinder and between 200 and 104 in a low pressure cylinder of two stage compressors, and at other suitable portions for multiple stage compressors. The air pressure in pipe 102 is connected into a chamber 108 in which it is used to assist in controlling the position of piston 92 and thereby valve 82. The position of valve 28 and the resulting pressure in chamber 108 is controlled preferably by an engine governor 110 driven from the main shaft 112 through intermediate shaft 114 and suitable gears as shown in Fig. 1. The valve 28 is connected to a movable sleeve 116 of governor 110 by a link 118 and a lever 120.

The pressure in chamber 108 acts on a diaphragm 122 and the thrust of diaphragm 122 is transmitted through rod 124 to a lever 126. The thrust of rod 124 tends to turn lever 126 clockwise about its fulcrum 128. A spring 130 fixed to the upper end of lever 126 opposes the thrust of rod 124 and diaphragm 122, spring 130 tending to turn lever 126 in the counter-clockwise direction. The lower end of lever 126 is enlarged to form a sleeve 132 surrounding an elongated chamber 134. Chamber 134 contains fluid under pressure delivered thereto from a pump 136 through pipe 138 containing throttle valve 140. Chamber 134 has a slot 142 in its side normally partly closed by sleeve 132. The pressure in chamber 134 depends upon the amount of opening through its walls for the escape of fluid so that the pressure in chamber 134 depends, at least in part, on the pressure in chamber 108. The pressure in chamber 134 is used to control the position of piston 92 and valve 82 by reason of the fact that a piston 144 mounted in a cylinder 146 formed as a bottom extension to chamber 134 is subjected on one side to the pressure in chamber 134 and is subjected on the other side to a spring 148 mounted between the bottom of the piston and the head of the cylinder to oppose the fluid pressure on the top of the piston. The piston 144 has a rod 150 extending from chamber 134 into a valve chamber 152. In chamber 152 is mounted a piston valve having balanced pistons 154 and 156 which are both fixed to the rod 150. Fluid under pressure is introduced into the space between pistons 154 and 156 by a pipe 158 connected to pump 136. If the rod 150 is lowered slightly from its position as illustrated in Fig. 1 a port 160 is uncovered and connected to the space between pistons 154 and 156.

Port 160 is connected to motor 90 at a point below piston 92. Lowering rod 150, and therefore piston 156, permits pressure fluid to enter below piston 92 to raise the piston 92 and turn the valve 82 in the closing direction. Raising rod 150 and piston valve 156 slightly from the position illustrated connects port 160 with the portion of cylinder 152 below valve 156 and thereby permits fluid from beneath piston 92 to escape through port 160, cylinder 152, and drain pipe 162. The pressure in motor 90 is therefore very sensitive to changes in pressure in chamber 134 and the amount of water supplied to chamber 16 is thus also sensitive to changes in pressure in chamber 134 and therefore to changes in water level in chamber 16. As the net loss of water from 16 increases with the increased weight of gas delivered from chamber 16 and as the level 18 tends to fall with increased loss of water it will be seen that the mechanism described normally increases the supply of water to chamber 16 with increase in weight of air or gas delivered through outlet valve 34.

In the foregoing description it has been assumed that throttle 28 has been wide open so as not to affect the pressure in chamber 16. However, in the apparatus illustrated, chamber 16 is used to supply air for combustion of fuel in power chamber 14. Power developed in chamber 14 is delivered to shaft 112 by the usual arrangement including rod 15 and crank 17, the pitman and cross-head being omitted from the drawing. If the load on the main engine shaft 112 falls off, the speed increases slightly and, in the arrangement illustrated, the air entering chamber 16 is throttled by valve 28, to reduce the rate of development of power in chamber 14. The necessary turning of valve 28 for this purpose is accomplished preferably by connecting the movable sleeve 116 of governor 110 to the lever 120 of valve 28 by means of link 118. As the speed of shaft 112 rises above a desired point, sleeve 116 lifts owing to the usual action of a speed governor, thereby turning valve 28 in the direction to throttle the air or gas passing through it. Throttling the gas passing to chamber 16, however, necessarily decreases the pressure in chamber 16 during the forcing stroke of piston 12 prior to the opening of valve 34.

Operation of valve 28 in governing the engine would therefore tend to increase the water supplied to chamber 16 by decreasing the pressure in chamber 108 and closing slot 142. This would increase the water supplied to chamber 16 and might cause interference between piston 12 and the water. It is necessary therefore to compensate the effect of the throttle valve 28 on the pressure in chamber 16 during the compression period so far as concerns the operation of the above described mechanism for adding water to chamber 16.

In the arrangement illustrated, the chamber 134 has a second aperture 164 in its walls and the escape of fluid through aperture 164 is governed by a sleeve 166. Sleeve 166 surrounds chamber 134 and is fixed at the upper end of a rod 168 mounted to slide in a guide 170. The position of 166 and the consequent rate of escape of fluid through aperture 164 is controlled from the governor 116 by means including a bell crank 172 pivoted at 179 and swivelled to sleeve 116. Lever 172 connects with rod 168 through link 176 and arm 178. As the speed of shaft 112 increases, sleeve 116 rises and the lever 172 thereupon moves rod 168 and sleeve 166 to the left to decrease the escape of fluid from chamber 134, thus maintaining the pressure in chamber 134 and compensating for the action of throttle 28.

As above mentioned, compression chamber 16 preferably forms a part of a combustion engine. In the arrangement illustrated chamber 16 is used to compress air. Compressed air from chamber 16 leaves the separator 40 by pipe 180 and passes through coil 182 in recuperator 184 in which the air is preheated to the ignition temperature of the fuel used in chamber 14. From coil 182 the air passes to chamber 14 by pipe 186 and intake valve 188. Exhaust gases leave chamber 14 by valve 190 and pass to recuperator 184 by pipe 192. It is evident that the amount of air per stroke delivered to chamber 14 depends in part upon the clearance volume in chamber 16. It follows that the maintenance of a constant maximum level 18 in chamber 16 is a necessary feature in an even development of power in chamber 14 and is essential to the proper running and governing of the engine of which chambers 14 and 16 are parts. More particularly, the arrangement above described, among its possibilities contributes to uniform speed regulation:

(a) Because it can be made to contribute to the maintenance of a substantially constant explosive mixture in the cylinder or cylinders of an internal combustion engine by varying the weight of air drawn into such cylinder or cylinders at each stroke proportionately to the load on the engine. It should be noted that such constant weight rate tends to produce higher efficiency of the engine at low loads;

(b) Because it can be made to contribute to the production of more uniform conditions of combustion and to a constant high sensitiveness of combustion, (in ordinary internal combustion engines of present-day design, the sensitiveness to combustion is greatest at high loads and diminishes with the load—in some cases to such an extent as to cause misfiring) through assisting in maintaining a more nearly constant air weight rate (and therefore a more nearly constant explosive mixture) at different loads; and (c) Because the movement of the governor of an internal combustion engine, which controls the amount of fuel injected per stroke proportionate to the load, can also be made to control the weight of air drawn into the cylinder per stroke substantially proportionate to the load and the maximum compression needed for a given load (whether constant per stroke or proportionate to the load), thus maintaining constant sensitiveness and uniformity of ignition at all loads, which markedly contributes to uniform speed regulation since it tends to eliminate hunting.

It has been found that the apparatus according to the present invention is capable of maintaining the maximum level of the liquid in the chamber 16 so nearly constant that it is practical to operate the apparatus with a clearance between the under surface of the piston 12 and the surface of the liquid 18 within 1/8 of an inch, thereby attaining a very high volumetric efficiency.

Having thus described the invention what is claimed as new is:

1. In a gas compressing apparatus, the combination of a chamber having a body of cooling liquid therein, means for conducting compressed gas from said chamber, means for separating liquid from said compressed gas and for returning liquid so separated to said body and means for adding liquid from an outside source to said body to maintain it at a given cyclic maximum level.

2. The combination in a gas compressor, of a compression chamber containing a body of cooling liquid, means at any given load on said compressor to add to said liquid at rates increasing with the decrease in pressure in said chamber during an intermediate portion of the forcing stroke of the compressor, and means to trap and return to said body liquid carried out of the said chamber with the compressed gas.

3. The combination in a compressor, of a compression chamber containing a body of cooling liquid, means to add to said liquid at rates increasing with the decrease in pressure in said chamber, during an intermediate portion of the forcing stroke of the compressor so long as the speed of the compressor is at or below normal, and means for retarding the rate of liquid addition of said liquid adding means with increase above normal of the speed of the compressor during such decrease in pressure.

4. The combination of a pump having an outlet and an inlet, a liquid circuit including said inlet, a valve in said circuit, means for operating said valve to throttle the flow of liquid in said circuit to force liquid through said outlet, a governor, and means whereby said governor acts on said operating means tending to increase the opening of said valve when the speed increases beyond a given degree.

5. The combination in a gas compressor of a cylinder, a pump for supplying liquid to said cylinder, a valve controlling the rate at which said pump supplies said liquid, and means controlled by the variations in the pressure in said cylinder for operating said valve to vary the rate of supply of said liquid to maintain a minimum effective clearance space within said cylinder.

6. The combination in a gas compressing apparatus, of a compressing chamber having a body of cooling liquid, a throttle valve for the gas intake into said compressing chamber, gas delivery connections leading from said chamber, separator connections leading from said gas delivery connections, a liquid in said connections, connections between said separator and said chamber for returning liquid from said separator to said chamber, a pump connected to deliver makeup fluid to said chamber, a by-pass valve arranged to regulate the fluid delivered to said chamber by said pump, a motor element, connections between said chamber and said element, means to open the last mentioned connections at an intermediate point in the forcing stroke of said apparatus to expose said element to the pressure in the said chamber, and to operate connections between said element and said by-pass valve, and means regulating the action of said element in said connections.

7. The combination as set forth in claim 6 in which the connections between the gas compressing chamber and motor element include a check valve arranged when seated to prevent regulating impulses from said chamber to said motor element, a holding means normally holding said check valve seated.

8. The combination as set forth in claim 6 in which the compressing apparatus includes a speed governor and connections between said speed governor and the said connections between the motor element and the by-pass valve arranged to neutralize the effect of said motor element on the said by-pass valve when the speed of the apparatus is above a given point.

9. In a gas compressor, the combination of a cylinder, and a piston and a body of liquid within said cylinder, means for cooling said liquid, and means whereby the effective surface of said liquid is maintained at a determined level whenever said piston has approached a given point in its travel.

10. In a gas compressor, the combination of a cylinder, and a piston and a body of liquid within said cylinder, and means whereby the effective surface of said liquid is maintained at a determined level whenever said pistons has approached a given point in its travel.

11. In a gas compressor, the combination of a cylinder, and a piston and a body of liquid within said cylinder, means for cooling said liquid, means for replenishing said liquid, and means whereby the effective surface of said liquid is maintained at a determined level whenever said piston has approached a given point in its travel.

12. In a compressor, a cylinder and a piston in combination with operating means and means whereby the compression is governed by the degree of compression over recurring cyclic periods.

13. In a compressor cylinder, a liquid and a piston and means whereby opposed reciprocating motions are imparted to said liquid and said piston whereby the effective clearance between said liquid and said piston is cyclically reduced to within 1/8".

14. In a gas compressor, a cylinder having inlet and outlet ports at a common level, a body of liquid therein, and means whereby the level of said body of liquid is maintained at the height of a horizontal plane lying within the limits of said port areas.

15. The combination in a gas compressor, of a compression chamber containing a body of cooling liquid, means at a given load on said compressor to add to said liquid at rates increasing with the decrease in mean pressure in said chamber, and means to trap and return to said body liquid carried out of said chamber with the compressed gas.

16. The combination in a gas compressor, of a compression chamber containing a body of cooling liquid, and means to add to said liquid at rates increasing with the decrease in mean pressure in said chamber if pressure variation in said chamber is due to decrease of said cooling liquid.

17. The combination in a gas compressor, of a compression chamber containing a body of cooling liquid, means to add to said liquid at rates increasing with the decrease in mean pressure in said chamber if pressure variation in said chamber is due to decrease of said cooling liquid, and means to trap and return to said body cooling liquid carried out of said compression chamber with the compressed gas.

18. The combination in a gas compressor, of a compression chamber containing a body of cooling liquid, means to add to said liquid at rates increasing with the decrease in mean pressure in said chamber if pressure variation in said chamber is due to decrease of said cooling liquid, and mean controlling such addition effective through the pressure in said compressor during a portion of the compression period.

19. The combination in a gas compressor, of a compression chamber containing a body of cooling liquid, and means to add to said liquid at rates increasing with the decrease in pressure in said chamber if pressure variation in said chamber is due to decrease of said cooling liquid.

20. The combination in a gas compressor, of a compression chamber containing a body of cooling liquid, means to add to said liquid at rates increasing with cyclic decrease in the pressure in said chamber when such decrease is due to decrease of level of said cooling liquid, said pressure effectuating during the forcing stroke of the compressor piston, and means for regulating and controlling said liquid adding means in restoring the level of said body to its normal state.

21. The combination of a pump having an outlet and an inlet, a liquid circuit including said inlet, a valve in said circuit, means for operating said valve to throttle the flow of liquid in said circuit to force liquid through said outlet, a motor element, and means whereby said motor element acts on said valve to cause it to throttle, an operated check valve, connections between said check valve and said motor element, said check valve being located in a compressing chamber having water therein, and means whereby said motor element operates to open said throttle valve in said circuit when the water level becomes too high in said chamber.

22. The combination in a gas compressing apparatus, of a cylinder having a body of cooling liquid in its bottom, a piston mounted to reciprocate in said cylinder, means for adding liquid to said body, and means for controlling said liquid adding means to maintain the cyclic maximum level of the said body substantially constant.

23. The combination in a gas compressing apparatus, of a compressing chamber having a body of cooling liquid, a throttle valve for the gas intake into said compressing chamber, gas delivery connections leading from said chamber, separator connections leading from said gas delivery connections, a liquid in said connections, connections between said separator and said chamber for returning liquid from said separator to said chamber, a pump connected to deliver make-up fluid to said body, a by-pass valve arranged to regulate the fluid delivered to said cylinder by said pump, a motor element, connections between said chamber and said element, means to open the last said connections during the forcing stroke of said apparatus to expose said element to the pressure in the said chamber to operate connections between said element and said valve, and means regulating the action of said element in said connections.

24. The combination in a gas compressing apparatus of a compressing chamber having a body of cooling liquid, a throttle valve for the gas intake into said compressing chamber, gas delivery connections leading from said chamber, separator connections leading from said gas delivery connections, a liquid in said connections, connections between said separator and said chamber for returning liquid from said separator to said chamber, a pump connected to deliver makeup fluid to said body, a by-pass valve arranged to regulate the fluid delivered to said cylinder by said pump, a motor element, connections between said chamber and said element, means to open the last said connections during a portion of the forcing stroke of said apparatus to expose said element to the pressure in the said chamber to operate connections between said element and said valve, and means regulating the action of said element in said connections.

25. The combination as set forth in claim 6 in which the motor element includes a compensating valve and the compressing apparatus includes a speed governor and a throttle valve for throttling the intake air entering said compressing apparatus, a connection between said speed governor and said throttle valve, and further connections between said speed governor and the compensating valve of said motor element, said compensating valve of said motor element being arranged to neutralize the effect of said motor element or the by-pass valve of said motor element whenever a change of pressure takes place not due to change of water level.

In testimony whereof I affix my signature.

WINDER E. GOLDSBOROUGH.